United States Patent
McCown et al.

(10) Patent No.: US 10,511,493 B1
(45) Date of Patent: Dec. 17, 2019

(54) APPARATUS AND METHOD FOR MANAGING DIGITAL IDENTITIES

(71) Applicant: Anonyome Labs, Inc., Draper, UT (US)

(72) Inventors: Steven Harvey McCown, Mapleton, UT (US); Paul Ashley, Queensland (AU); Steve Shillingford, Draper, UT (US); Greg Clark, San Francisco, CA (US)

(73) Assignee: ANONYOME LABS, INC., Draper, UT (US)

( * ) Notice: Subject to any disclaimer, the term of this patent is extended or adjusted under 35 U.S.C. 154(b) by 60 days.

(21) Appl. No.: 15/897,858

(22) Filed: Feb. 15, 2018

Related U.S. Application Data

(60) Provisional application No. 62/537,882, filed on Jul. 27, 2017.

(51) Int. Cl.
| | |
|---|---|
| *H04L 12/24* | (2006.01) |
| *H04L 29/06* | (2006.01) |
| *H04L 29/08* | (2006.01) |
| *H04L 29/12* | (2006.01) |
| *H04L 12/58* | (2006.01) |

(52) U.S. Cl.
CPC ............ *H04L 41/28* (2013.01); *H04L 61/307* (2013.01); *H04L 63/0281* (2013.01); *H04L 67/28* (2013.01); *H04L 51/22* (2013.01)

(58) Field of Classification Search
CPC ...................................................... H04L 41/28
USPC ........................................................ 709/225
See application file for complete search history.

(56) References Cited

U.S. PATENT DOCUMENTS

| | | | | |
|---|---|---|---|---|
| 6,205,330 | B1 * | 3/2001 | Winbladh | H04L 51/066 379/93.24 |
| 7,493,497 | B1 * | 2/2009 | Tan, Jr. | G06F 21/602 380/277 |
| 7,546,349 | B1 * | 6/2009 | Cooley | G06Q 10/107 709/206 |
| 8,627,437 | B2 * | 1/2014 | Dietrich | G06F 21/34 726/9 |
| 9,372,987 | B1 | 6/2016 | Ashley et al. | |
| 9,374,689 | B1 | 6/2016 | Ashley et al. | |
| 9,703,986 | B1 | 7/2017 | Ashley et al. | |
| 9,729,519 | B1 | 8/2017 | Ashley et al. | |

(Continued)

FOREIGN PATENT DOCUMENTS

BE    1012936 A6 *    6/2001    ....... G06K 19/06037

OTHER PUBLICATIONS

Dictionary com, "compartmental", 2019 (Year: 2019).*

(Continued)

*Primary Examiner* — Ondrej C Vostal
(74) *Attorney, Agent, or Firm* — Cooley LLP

(57) ABSTRACT

An apparatus has a processor and a memory connected to the processor. The memory stores instructions executed by the processor to store identity attributes including real identity attributes for a real individual and at least two sets of digital identity attributes each operative as a personal privacy proxy with compartmental identity attributes. The at least two sets of digital identity attributes include a first machine generated digital identity email address associated with a first role and a second machine generated digital identity email address associated with a second role.

16 Claims, 6 Drawing Sheets

(56) References Cited

U.S. PATENT DOCUMENTS

| | | | |
|---|---|---|---|
| 9,846,716 B1* | 12/2017 | Scott | G06F 9/546 |
| 10,178,106 B1 | 1/2019 | Ashley et al. | |
| 10,320,753 B1 | 6/2019 | Ashley et al. | |
| 2004/0204998 A1* | 10/2004 | Shah | G06Q 20/20 |
| | | | 705/16 |
| 2004/0205026 A1* | 10/2004 | Shah | G06Q 30/02 |
| | | | 705/50 |
| 2004/0267578 A1* | 12/2004 | Pearson | G06Q 30/06 |
| | | | 705/4 |
| 2005/0131811 A1* | 6/2005 | Ranzini | G06Q 10/107 |
| | | | 705/39 |
| 2005/0144243 A1* | 6/2005 | Cheng | G06F 17/2247 |
| | | | 709/206 |
| 2007/0208869 A1* | 9/2007 | Adelman | G06Q 10/107 |
| | | | 709/229 |
| 2008/0052364 A1* | 2/2008 | Zhou | G06Q 10/107 |
| | | | 709/206 |
| 2008/0177864 A1* | 7/2008 | Minborg | H04L 43/00 |
| | | | 709/219 |
| 2009/0319795 A1* | 12/2009 | Sharif | G06F 21/64 |
| | | | 713/176 |
| 2011/0029778 A1* | 2/2011 | Garcia Morchon | H04L 9/083 |
| | | | 713/171 |
| 2011/0191578 A1* | 8/2011 | Hayes | H04L 63/0823 |
| | | | 713/155 |
| 2012/0047003 A1* | 2/2012 | Hammad | G06Q 30/0207 |
| | | | 705/14.1 |
| 2012/0084365 A1* | 4/2012 | McCann, Jr. | G06F 3/1204 |
| | | | 709/206 |
| 2013/0103677 A1* | 4/2013 | Chakra | G06F 3/04842 |
| | | | 707/723 |
| 2013/0212200 A1* | 8/2013 | Dennis | H04L 51/22 |
| | | | 709/206 |
| 2013/0318199 A1* | 11/2013 | Le Jouan | H04L 67/02 |
| | | | 709/217 |
| 2015/0088650 A1* | 3/2015 | Taylor | G06Q 30/0256 |
| | | | 705/14.54 |
| 2015/0143522 A1* | 5/2015 | Baum | G06F 17/2785 |
| | | | 726/23 |
| 2015/0288639 A1* | 10/2015 | Xuan | H04L 51/22 |
| | | | 709/206 |
| 2017/0048229 A1* | 2/2017 | Leow | H04M 1/72527 |
| 2017/0099291 A1* | 4/2017 | Clark | G06F 16/9535 |
| 2017/0222922 A1* | 8/2017 | Zlatokrilov | H04L 43/106 |
| 2017/0288877 A1* | 10/2017 | Abt, Jr. | H04L 63/061 |
| 2017/0302455 A1* | 10/2017 | Abt, Jr. | H04L 9/3247 |
| 2018/0018721 A1* | 1/2018 | Ali | G06N 5/04 |
| 2018/0218173 A1* | 8/2018 | Perkins | H04L 63/0421 |
| 2018/0375953 A1* | 12/2018 | Casassa Mont | H04L 12/28 |

OTHER PUBLICATIONS

TechTarget, "persistent storage", 2019 (Year: 2019).*
Castro, "Electronic Identification", 2011 (Year: 2011).*
Hornung et al., "An ID card for the Internet—The new German ID card with 'electronic proof of identity'", 2010 (Year: 2010).*
Murchison, "Sieve Email Filtering: Subaddress Extension", 2008 (Year: 2008).*

* cited by examiner

APPARATUS AND METHOD FOR MANAGING DIGITAL IDENTITIES

CROSS-REFERENCE TO RELATED APPLICATION

This application claims priority to U.S. Provisional Patent Application Ser. No. 62/537,882, filed Jul. 27, 2017, the contents of which are incorporated herein by reference.

FIELD OF THE INVENTION

This invention relates generally to communications in computer networks. More particularly, this invention relates to managing digital identities utilized in computer networks.

BACKGROUND OF THE INVENTION

Initially, a number of terms will be defined. As used herein, "Identity" refers to the characteristics determining who or what a person or thing is. A "Legal Identity" is a set of identifying attributes, as designated by a $3^{rd}$ Party, which are used for verification, validation and authentication. A "Digital Legal Identity" is a digital equivalent of a Legal Identity. A "Digital Identity" (DI) is a role-based digital identity that is created, controlled and managed by an individual and is used for verification, validation and authentication. Every individual has real identity attributes, such as name, email address, physical address, telephone number and the like. A digital identity has digital identity attributes operative as a personal privacy proxy with compartmental identity attributes. For example, a first digital identity may have a name, email address, physical address and telephone number different than the real identity attributes and also different than a second digital identity.

Internet users face a barrage of tracking functions that monitor the websites they visit, the pages they read, and the online activities they perform. To expand this user profiling, current and emerging tracking technologies compare activities across multiple websites and use Artificial Intelligence (AI) to make inferences based on information collected about each user.

One common method of correlating a user's personal information and their online activities is to index those data items by a data item that is usually unchangeable and common across all of a user's various online activities. This 'indexing data item' functions as a 'primary indexing key' to correlating a user's various types of personal and activity information. The problem with primary indexing keys is that they are either unchangeable (e.g., social security account number) or they are cumbersome to change as they cascade into changing numerous other accounts. The latter is the case with phone numbers, social media credentials, login names, email addresses, etc. This has created a dilemma for users who find it both useful and potentially risky to give out that information.

One common method of disrupting the correlation of a user's personal information with their online activity information is to change or alter the primary indexing key being used by analytics gathering methods. In some scenarios, users may obtain new phone numbers or email addresses in order to segment their activities and thereby block correlation. Anonyome Labs®, San Francisco, Calif. distributes an application called Sudo® to manage digital identities. The application allows users to create and manage multiple email addresses (also phone numbers and credit card numbers) so as to disrupt user tracking activities. Using such applications, users may create a new digital identity to isolate one set of their online activities from another set of online activities. For example, this helps users compartmentalize their work activities from their other activities related to other interests such as social, political, medical, etc.

Creating new digital identities helps users to compartmentalize classes or types of online activities (e.g., to keep online work activities separate from social activities). However, each class of activity (e.g., personal versus work) can also be subdivided into numerous roles, such as: sending/receiving of email, purchasing, newsletter subscriptions, web researching, personal medical research, etc.

Over time, analytics gathering entities can collect sufficient personal and online activity details to 'paint a picture' or model the user's created digital identity. This opens the digital identity to some of the same tracking and profiling activities that are currently directed at real-world users.

In one scenario, a user may have created a well-defined digital identity (including a corresponding email address) that is functioning perfectly to suit the user's needs. Using that digital identity, the user may have created well-established connections via social media, children's sporting activities, payment providers, or even a medical history. In this instance, the digital identity is functioning as desired. Then, without warning, the user may inadvertently disclose the digital identity's email address to someone that they previously did not know was a spammer or otherwise engaged in online usage tracking activities. At this point, the user's digital identity starts to be tracked, receives spam email, or other undesired solicitations that cannot be stopped.

In the above scenario, one resolution is that the user could change the digital identity's email address or even delete the digital identity in order to block the tracking or spamming activities. While these are perfectly legitimate solutions, they may require the user to re-build the digital identity with a new email (or other digital identity information such as a phone number or login name) and then re-connect the new information to each of the legitimate activities, websites, and/or people previously connected to the original digital identity. This could disrupt user activities, because, once given out, an email address cannot readily be replaced without a lot of effort.

Another resolution to the above scenario would make disconnecting from the spammer much simpler if the user had sub-divided the digital identity into roles. In this usage, a digital identity role would be limited to a specific activity within the scope of numerous activities related to a user's digital identity. For example, a role might be limited to a user's medical appointments with a doctor(s). In this case, a user might have a role-specific email address used to sign up with a doctor's office to receive email reminders of upcoming visits. Creating a role-specific email address allows the user to specifically limit that particular email address to personal doctor(s). With role-specific emails, it will be easy to identify the email address used by a spammer. Additionally, a role's email address is likely only used by one (or few) role recipients. In this case, if a user wants to delete or change the email address associated with a role, it is much simpler to clean up the results of an email address being compromised by a spammer, linked to analytics gathering, or otherwise used inappropriately. Even removing an entire role is a much simpler solution than deleting, re-creating, and then re-connecting a new digital identity that was otherwise functioning satisfactorily.

One embodiment of the role-based solution can be implemented with the process defined in RFC 5233 (https:// tools.ietf.or/html/rfc5233). RFC 5233 describes a method of 'sub-addressing' or 'detailed addressing' of email addresses. For example, an email server may define a method of sub-addressing that it can interpret while still being compliant with modern email standards. The following example shows how a standard email may be sub-addressed to form a technically different email address, but an email address that can still be correlated to a real user.

Main Email: johndoe@example.com
Sub-Address #1: ebay+johndoe@example.com
Sub-Address #2 amazon+johndoe@example.com With the RFC 5233-based hierarchy of email address shown above, users can give a unique email to their various role activities. With the RFC 5233 implementation, the implementing email server will define a separator character such as '+'. This allows users to easily create new sub-addresses and also enables the server to deterministically recognize, sort, and route all incoming traffic to each of the 3 email addresses to the same inbox.

However, RFC 5233 also defines that the non-root subpart of the email address (e.g., 'ebay' or 'amazon' from the addresses shown above), will allow email clients and servers to automatically sort or categorize emails arriving at each of the addresses. This is done by the server stripping off the non-root portion and the separator character, so that the root email address remains. In this scenario, the root email addressed is used to deliver incoming emails to the user's inbox and the non-root portion is used to help the user's inbox separate the incoming emails into folders designated by the non-root email portion. For example, a user may have a sub-inbox called 'amazon' where only the 'amazon' emails are collected. This process greatly simplifies inbox management.

The downside of the RFC 5233 method is that websites seeking to collect personal information and track users have little problem analyzing addresses and quickly recognizing the separator character and the subparts of the email address. Although different email providers can choose a different separator character and nefarious websites will need to recognize the separator character and the sub-parts of the address, it is reasonable to presume that this is a fairly simplistic process and will quickly be mapped.

If a nefarious website collects email addresses and decodes the 'user' or 'local-part' (i.e., the portion of an email address before the '@' symbol) of the email address, then they can easily continue to email the user's root email address regardless of whether the user has intentionally deleted the sub-address previously given to the nefarious website. Thus, there is a need for improved techniques for managing digital identity credentials.

SUMMARY OF THE INVENTION

An apparatus has a processor and a memory connected to the processor. The memory stores instructions executed by the processor to store identity attributes including real identity attributes for a real individual and at least two sets of digital identity attributes each operative as a personal privacy proxy with compartmental identity attributes. The at least two sets of digital identity attributes include a first machine generated digital identity email address associated with a first role and a second machine generated digital identity email address associated with a second role.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The problems with using a single general email address or even an RFC 5233 sub-addressed email addressing mechanism have been defined above. This invention describes a Digital Identity Address Management (DIAM) system that will enable an email server system to accomplish the following:

1. Create a unique email address for each of a digital identity's roles.
2. Deter a nefarious website from mapping a DIAM email address to the digital identity's main email address.
3. Deter a nefarious website from mapping one of a digital identity's DIAM email addresses to other of its DIAM addresses.
4. Enable a digital identity to delete a DIAM email address and refuse (or block) any new email.

Figure 1:
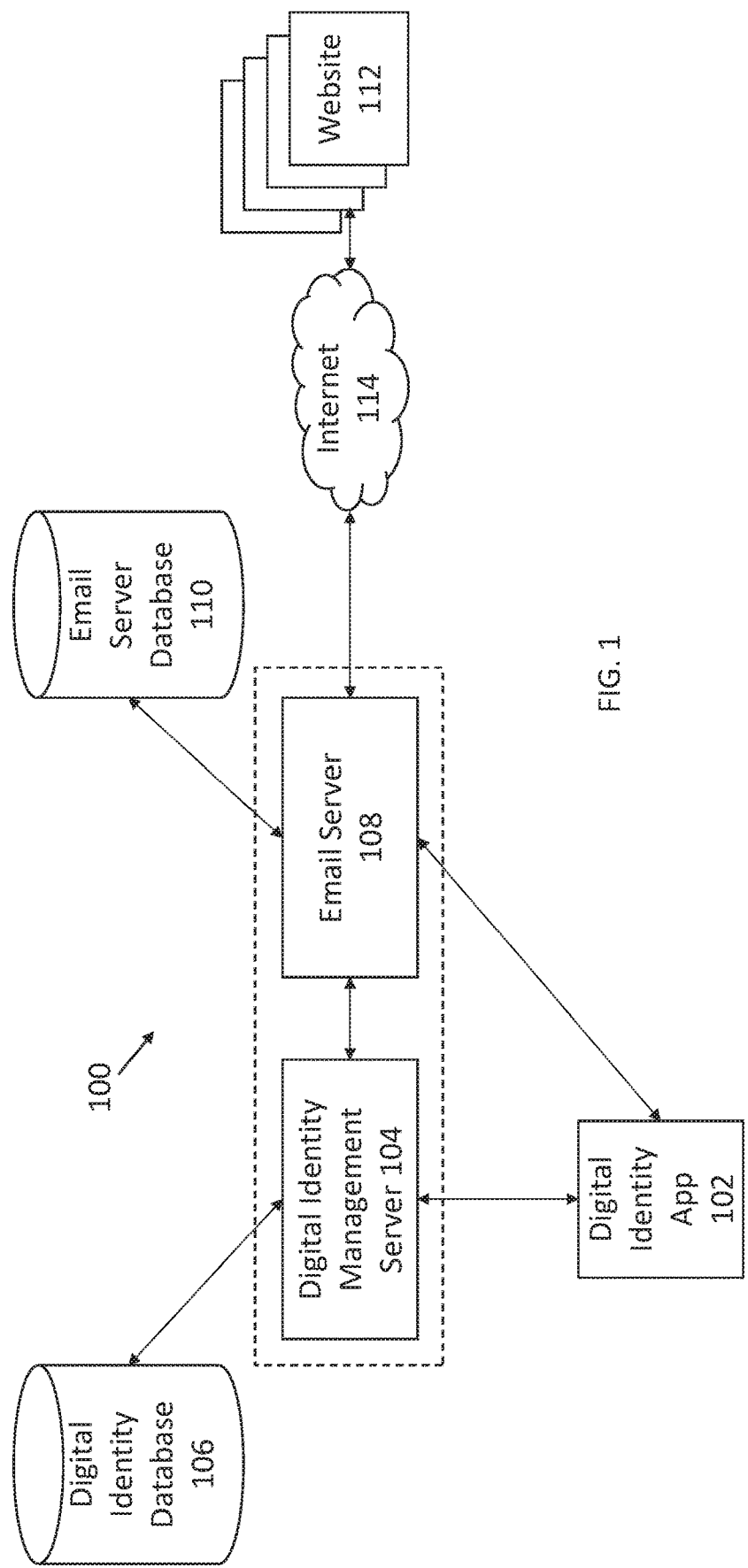
FIG. 1 illustrates a digital identity system architecture configured in accordance with an embodiment of the invention.

FIG. 1 illustrates a digital identity architecture 100. A Digital Identity App 102 (e.g., a client device, such as a computer, tablet or smartphone executing an application configured in accordance with an embodiment of the invention) accesses a digital identity management server 104, which has an associated digital identity database 106. The digital identity management server 104 communicates with an email server 108, which has an associated email server database 110. This architecture allows the client 102 to access a web site 112 via internet 114. The digital identity management server 104 manages the digital identity functions. The email server 108 is used to send and receive digital identity emails. One exemplary process flow follows:

1. The Digital Identity App (DIA) 102 submits a request to the Digital Identity Manager Server (DIMS) 104 to create a new role.
2. The DIMS 104 receives the request and creates the new role as directed and assigns it to the DI's account.
3. The DIMS 104 synchronizes the new role additions with the Digital Identity App 102.
4. Once the new role is created, the DIA 102 requests a new email address for the new role.
5. Upon receiving the request, the DIMS 104 requests that the Email Server (ES) 108 create a new email address.
6. The ES 108 creates a new email address and returns it to DIMS 104.
7. The DIMS stores the new email address in the DIA's account (e.g., database 106).
8. The DIMS 104 synchronizes the account changes with DIA client 102.

Creating a new email address is different from normal methods where a user chooses a memorable name that they can easily remember in that the DIAM process creates a machine generated email address. In this process, a machine generated email address is one that is generated using a random, pseudo random, or other type of email address creation process that results in an address that is non-deterministic to the digital identity or its other roles from a vantage point outside of the DIAM server configuration.

Some web servers reject random numeric addresses on the assumption that they traffic in spam. Accordingly, an embodiment of the invention machine generates a role-based email that is still not directly attributable. For example, in the case of a main Digital Identity of john.doe@sudomail.com, then some of the many role-based emails that could be created are: jdoe@sudomail.com or jd@sudomail.com, john007@sudomail.com (calculated), or even a hobby-based email (e.g., john007_amazon@sudomail.com), etc. Since the purpose is not necessarily to generate truly random email addresses, it may be desirable for the user to create 'randomized' email addresses that are easy to convey verbally. To create these types of email addresses, algorithms could be employed to generate addresses consisting of word combinations, such as cat_dog@sudomail.com. Addresses of this type resemble addresses that users would create, but are also created algorithmically such that they do not disclose the root email address or make direct references to a particular DI.

In one embodiment, the DIAM system creates a randomized email address as follows:
1. The Digital Identity Management Server (DIMS) 104 generates a random (as previously defined) 'local-part' for the new email address.
2. The DIMS 104 verifies with the Email Server (ES) 108 that the new 'local-part' is not in use.
3. If the randomized email address just created is in use, then loop to Step 1 until a unique 'local-part' is generated.
4. With a unique 'local-part', DIMS 104 requests that the Email Server (ES) 108 create a new email address using the unique 'local-part'.
5. The ES 108 creates the requested email address.
6. The DIMS 104 assigns the new email address to the requesting DI's account.
7. DIMS 104 saves account updates in the Digital Identity Database 106.
8. The newly created email account information and other changes to a digital identity's account are synchronized with the Digital Identity App 102.

Figure 2:
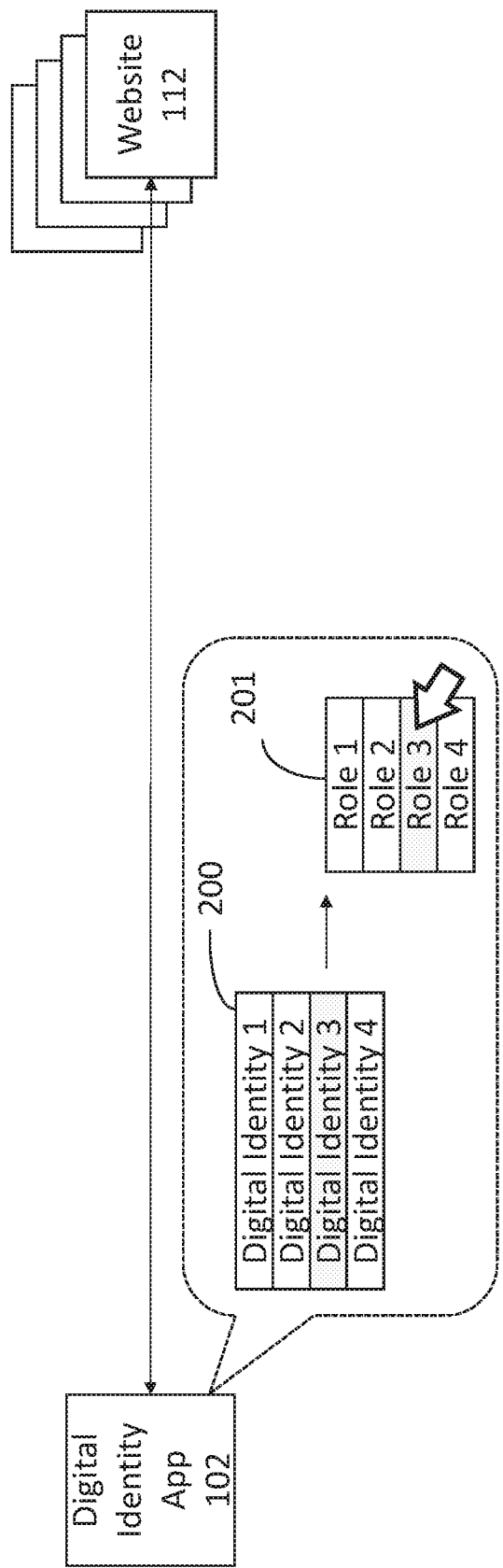
FIG. 2 illustrates role based processing performed in accordance with an embodiment of the invention.

The Digital Identity App 102 is a mechanism that manages one or more digital identities for a user. Each digital identity manages one or more roles within the digital identity. FIG. 2 illustrates a menu 200 supplied by the Digital Identity App 102, which allows a user to select a digital identity. After selecting a digital identity, a menu 201 allows a user to select a role for the selected digital identity when accessing a web site 112. This facilitates compartmentalized network activity first by a digital identity and second by the digital identity's role.

Figure 3:
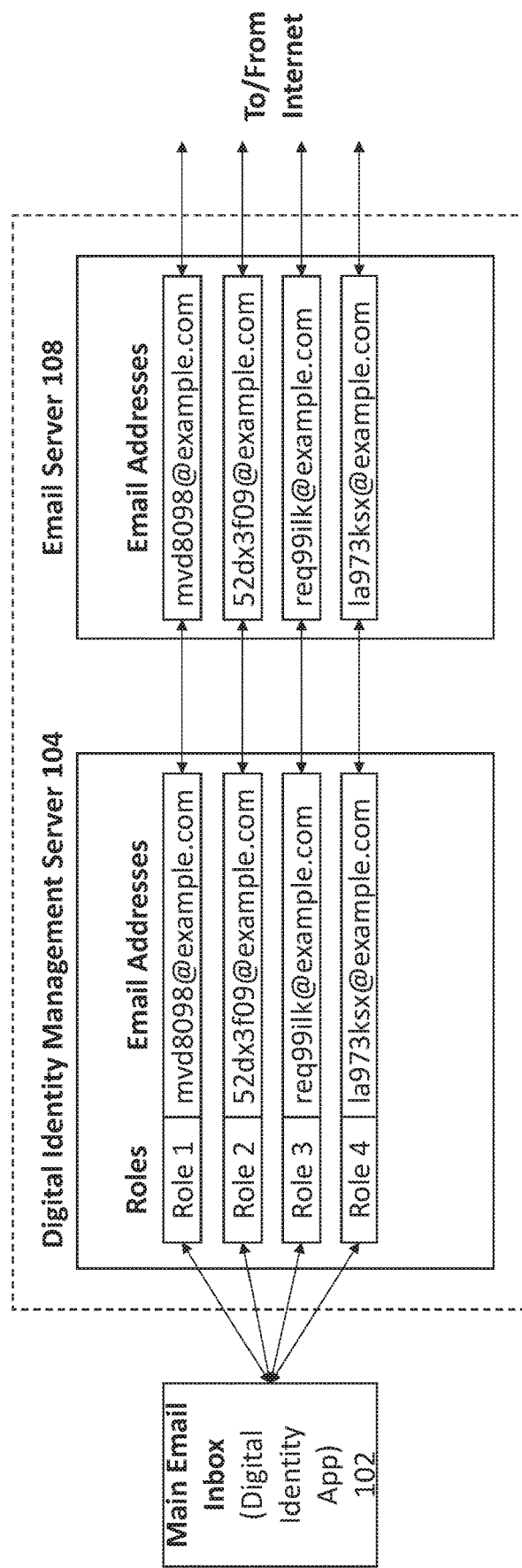
FIG. 3 illustrates machine generated email mapping performed in accordance with an embodiment of the invention.

FIG. 3 depicts how various machine generated email addresses are correlated within the DIAM server 104, the Email Server 108, and the Digital identity's email inbox 102. With this mapping process, all of the machine generated email addresses corresponding to the various roles within a digital identity may be independently used, but then the incoming emails are processed according to the mapped role and are then collected within the digital identity's email inbox. Since the incoming emails are received using machine generated emails corresponding to the digital identity's roles, the inbox may be sorted by role. Among other sorting methods, this enables a user to select, view, or manage the emails of one role separately from the emails of another role.

Figure 4:
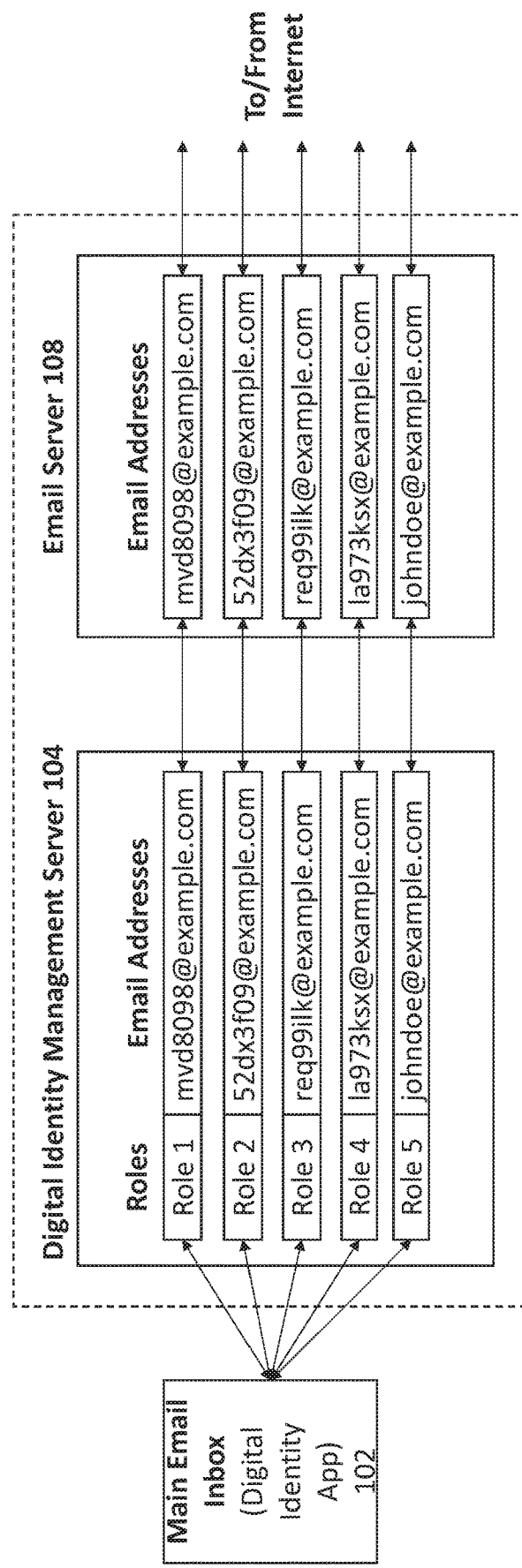
FIG. 4 illustrates machine generated email mapping and real email mapping performed in accordance with an embodiment of the invention.

FIG. 4 extends the machine generated email mapping system from FIG. 3 to include a 'root' email address. While using machine generated email addresses for most roles provides numerous benefits (outlined above), it may be preferable to include a memorable email address (e.g., johndoe@example.com) that users can easily convey to other online users or in an offline venue.

Occasionally it may be desirable to delete or deactivate (which could be later reactivated) a role or email address. In these instances, it is important that the Email Server 104 and Digital identity Management Server 108 do not reuse an email address. This is because a user may have used that email address for a sensitive process such as two-factor authentication or an account recovery process. As a result, a record of all email addresses used in the DIAM process must be maintained, indefinitely.

Figure 5:
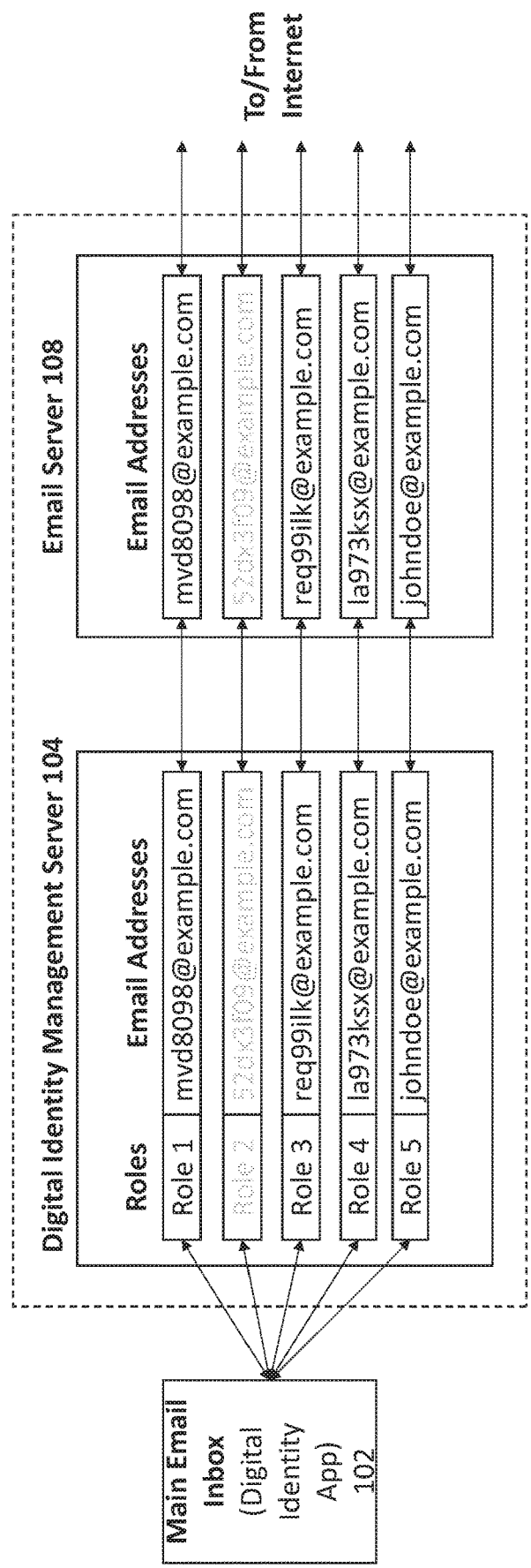
FIG. 5 illustrates deactivation of a role based email address in accordance with an embodiment of the invention.

In addition to the Digital Identity Management Server maintaining a record of previously used email addresses, those email addresses must also be maintained as linked to the specific digital identity and role to which they were originally assigned. This helps the digital identity manage previously received emails regardless of whether the email address will ever be used to send or receive email again. FIG. 5 shows an inactive (or deleted) role within a digital identity's account.

Figure 6:
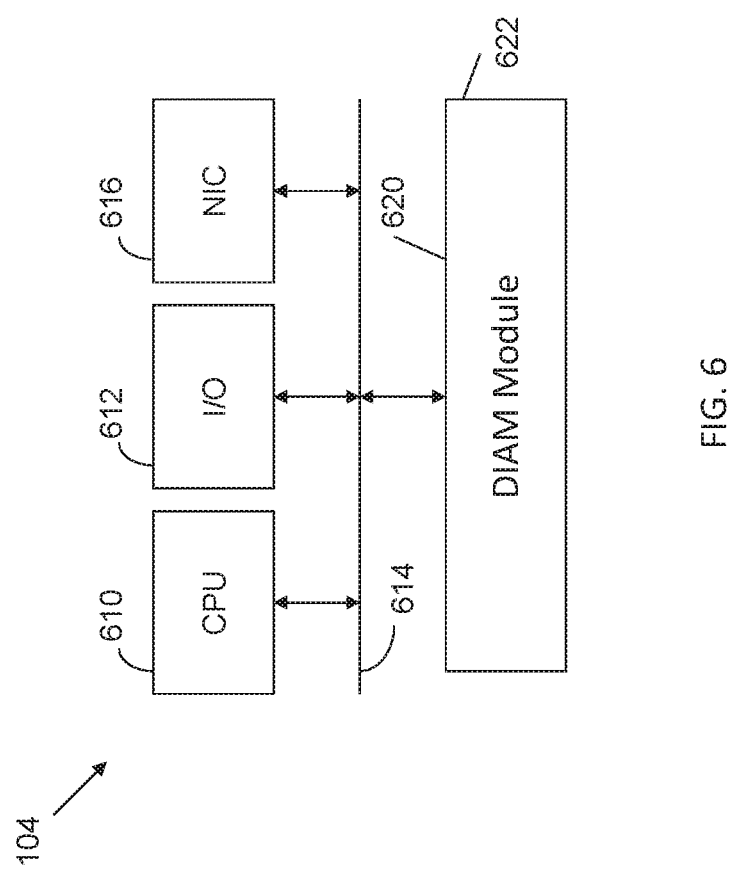
FIG. 6 illustrates a machine configured to implement operations disclosed herein.

FIG. 6 illustrates that the digital identity management server 104 may include a processor 610 connected to input/output devices 612 via a bus 614. A network interface circuit 616 is also connected to the bus and provides connectivity to the different components previously disclosed, such as a digital identity database 106, email server 108, Digital Identity App 102, internet 114 and website 112. A memory 620 is also connected to the bus 614. The memory 620 stores a DIAM module 622 with instructions executed by the processor 610 to implement operations disclosed herein.

This disclosure describes how the currently used email address processes (and the email addresses themselves) facilitate their usage by analytics trackers, harmful websites, or other nefarious actors to track users and monitor online activities. This can be true even when digital identity processes are used to separate a user's various online activities. This disclosure also presents a method whereby machine-generated unique email addresses may be created and assigned to the various different activities or roles performed by the user of a digital identity, as well as, how those email addresses may be further changed or replaced, periodically. By utilizing a separate machine-generated email address for each of the various roles performed by each digital identity, digital identity users will further segment their online activities so as to better disrupt online tracking activities. If it becomes necessary to delete or deactivate an email address, then the described process of assigning a separate email address to each of a digital identity's roles allows a digital identity user to replace the affected email address without the larger logistical impacts incurred if there were only one email address for an entire digital identity.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA), C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a processor; and
a memory connected to the processor, the memory storing instructions executed by the processor to:
store and manage identity attributes including real identity attributes for a real individual and at least two sets of digital identity attributes each operative as a personal privacy proxy with compartmental identity attributes, wherein the at least two sets of digital identity attributes include a first machine generated digital identity email address associated with a first role and a second machine generated digital identity email address associated with a second role; and
prompt a digital identity owner to approve or disapprove the first machine generated digital identity email address and the second machine generated digital identity email address.

2. The apparatus of claim 1 further comprising instructions executed by the processor to persistently store information regarding a deactivated email address.

3. The apparatus of claim 1 further comprising instructions executed by the processor to persistently store information regarding a deactivated role.

4. The apparatus of claim 1 further comprising instructions executed by the processor to communicate with a Digital Identity Client device.

5. The apparatus of claim 1 further comprising instructions executed by the processor to communicate with an email server.

6. The apparatus of claim 1 further comprising instructions executed by the processor to route email traffic associated with the digital identity attributes to a combined email inbox on a client device.

7. The apparatus of claim 1 further comprising instructions executed by the processor to reactivate a deactivated email address of the digital identity attributes.

8. The apparatus of claim 1 further comprising instructions executed by the processor to reactivate a deactivated role of the digital identity attributes.

9. An apparatus, comprising:
a processor; and
a memory connected to the processor, the memory storing instructions executed by the processor to:
store and manage identity attributes including real identity attributes for a real individual and at least two sets of digital identity attributes each operative as a personal privacy proxy with compartmental identity attributes, wherein the at least two sets of digital identity attributes include a first machine generated digital identity email address associated with a first role and a second machine generated digital identity email address associated with a second role; and
route email traffic associated with the digital identity attributes to a combined email inbox on a client device.

10. The apparatus of claim 9 further comprising instructions executed by the processor to persistently store information regarding a deactivated email address.

11. The apparatus of claim 9 further comprising instructions executed by the processor to persistently store information regarding a deactivated role.

12. The apparatus of claim 9 further comprising instructions executed by the processor to communicate with a Digital Identity Client device.

13. The apparatus of claim 9 further comprising instructions executed by the processor to communicate with an email server.

14. The apparatus of claim 9 further comprising instructions executed by the processor to prompt a digital identity owner to approve or disapprove the first machine generated digital identity email address and the second machine generated digital identity email address.

15. The apparatus of claim 9 further comprising instructions executed by the processor to reactivate a deactivated email address of the digital identity attributes.

16. The apparatus of claim 9 further comprising instructions executed by the processor to reactivate a deactivated role of the digital identity attributes.

* * * * *